Feb. 6, 1968  S. HANSEN  3,367,047

MOLECULAR FLOW ANALOG

Filed June 21, 1965

INVENTOR.
SIEGFRIED HANSEN,
BY
J. K. Haskell
ATTORNEY.

United States Patent Office 3,367,047
Patented Feb. 6, 1968

3,367,047
MOLECULAR FLOW ANALOG
Siegfried Hansen, Los Angeles, Calif., assignor to Hughes Aircraft Company, Culver City, Calif., a corporation of Delaware
Filed June 21, 1965, Ser. No. 465,602
1 Claim. (Cl. 35—13)

ABSTRACT OF THE DISCLOSURE

Apparatus which simulates the effects of a structure and its walls on a fluid molecular flow by constructing a model of the structure under investigation, depositing a coating on the walls of the structure, such coating having optical properties which simulate the structure walls of a fluid flow system, then illuminating the structure with light from the side of fluid flow, and then measuring the amount of light passing through the structure by a photo cell.

---

This invention relates to apparatus for simulating the molecular flow of fluids and more particularly to improvements therein.

The design of apparatus such as vacuum apparatus is facilitated by an accurate knowledge of the pattern of molecular flow in the system. Heretofore, these flow patterns have been determined by measurement on actual working models, by mathematical approximations of low accuracy, or by "Monte Carlo" programming of a digital computer. All of these methods are either time consuming or produce results of unsatisfactory accuracy.

Problems of molecular flow in other fields than the design of vacuum apparatus have often been solved by the use of a physical analog. A good example is the use of an electrolytic tank and probe to plot the electric field configuration of a set of electrodes. Thus, it would appear that if a conveniently and easily manipulated analog system can be found, the measurement of molecular flow distribution could be simplified.

An object of this invention is the provision of a molecular flow analog which is simple to construct.

Yet another object of the present invention is the provision of a molecular flow analog wherein measurements are simply made and yet are substantially accurate.

Still another object of the present invention is the provision of a molecular flow analog which is relatively inexpensive to construct.

These and other objects of the invention may be achieved by using an optical analog, such as light, to simulate the fluid whose characteristics in a structure are required to be simulated. An analog of the structure itself may be constructed wherein the walls of the analog simulate the effects of the walls of the structure by giving the surfaces special optical finishes.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
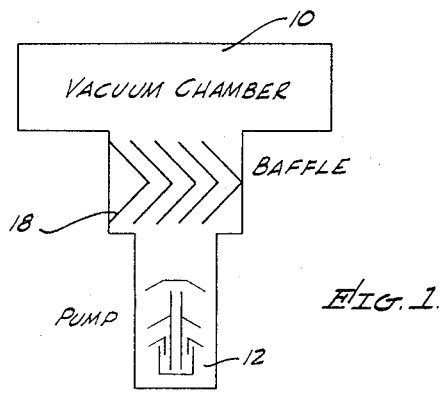
FIGURE 1 is a schematic drawing of a vacuum system using a diffusion pump in which it is desired to determine the molecular flow.

In the choice of an analog for determining molecular flow, the following characteristics of molecular flow are significant. (1) Collisions between molecules are negligible. (2) Molecules move in straight lines between successive collisions with the walls of a vacuum system. (3) The angle of departure from a wall with which a molecule collides, is independent of the angle of incidence. (4) The departure of molecules from a given point on a wall will have a probability distribution varying as the cosine of the angle from the normal to the wall. (5) Under steady state conditions, the rate of departure of molecules from a warm wall will be equal to the rate of arrival. (6) At a cold wall, some fraction of the incident molecules will be absorbed, depending upon the gas, the wall temperature, and the accommodation coefficient. (7) At a cold wall, the unabsorbed molecules will depart with reduced velocity, but their space distribution and flow rate will be unaffected.

Most of these characteristics can be approximated quite accurately using an optical analog in which light represents the gas molecules and the walls of the vacuum system are represented by surfaces which are given special optical finishes. The flow of the molecules is represented by the intensity of the light as measured by a very small photovoltaic probe.

Considering the same set of characteristics as enumerated above, then it can be stated that: (1) Collisions between photons are negligible. (2) Photons move in straight lines between collisions with the walls of a model. (3) The angle of departure from a wall can be made very nearly independent of the angle of incidence if the surface is treated with a finish having good diffusion characteristics. Such a finish is known as a flat or matt finish. (4) A flat or matt finish will closely approach the desired cosine probability or "Lambert" distribution. (5) A finish for a wall which simulates a warm wall wherein the rate of departure of molecules equals the rate of arrival, in optical terms is a "flat" finish with 100% diffuse reflectance.

A finish which met these requirements with sufficient accuracy was determined as the finish provided by freshly electroplated copper. The extent of the matt finish can be determined by controlling the time and current density used in the plating process. The light which worked best was light having wavelengths in the near infra-red region.

(6) The simulation of a cold wall does not present any serious problems since reflectances of the desired value can be simulated employing "flat" grey paints. While 100% light absorption cannot be obtained, there are commercially available flat black paints which provide a 98% absorbing finish. Such black paints are sold, for example, by the Minnesota Mining & Manufacturing Company. The use of this paint to represent a 100% absorber results in negligible error. (7) At an absorbing wall, the unabsorbed photons are unaffected in velocity, angular distribution and flow rate. Since only flow rate is of interest, a discrepancy in the representation of velocity is of no consequence.

By way of example, and not to be construed as a limitation upon the invention, or as the only device for which an analog may be constructed in accordance with this invention, in FIGURE 1 there is shown in cross-section a typical vacuum system wherein there is provided a vacuum chamber 10. A diffusion pump 12 is placed in the chamber 14 connected to the vacuum chamber 10. In order to prevent a backflow of vapor from the pump into the vacuum chamber, a plurality of chevron baffles 18 are employed.

The baffles besides preventing pump vapor backflow, also impede the flow of gas from the chamber to the pump. It is necessary to determine what percentage of the molecules incident on the chamber side of the baffles will actually pass through to the pump.

To solve this problem in accordance with this invention, a model of the baffles is constructed and a diffused light source is provided to represent the input to the baffles, and a black surface represents the pump which absorbs the gases.

Figure 2:
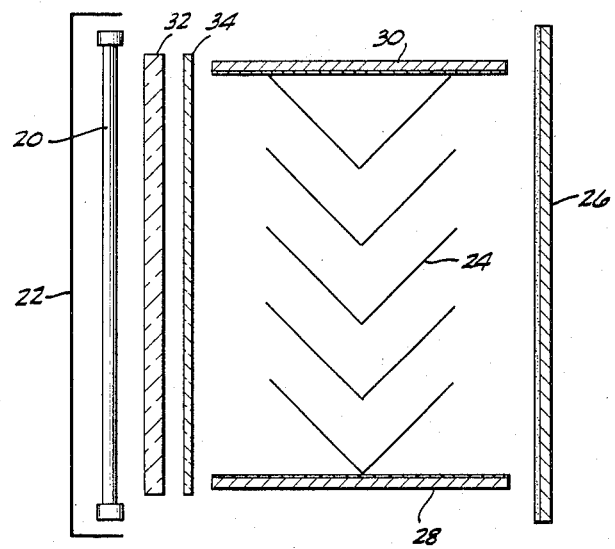
FIGURE 2 is a schematic representation of a molecular flow analog structure, in accordance with this invention, for FIGURE 1.

FIGURE 2 is a cross-sectional schematic view illustrating the analog structure. A light source 20 with a reflector 22 is placed on one side of the row of chevron baffles 24 which simulate the baffles 18 in the actual structure. On the other side of the chevron baffles is a plate 26 having the surface which opposes the baffles 24 painted with an absorbing black matt finish. The baffles 24 and side walls 28, 30, are made of any suitable material, which, however, has had its surfaces electroplated with copper. The frequency of the light source is in the near infra-red type. This is achieved by using white light which passes through an infra-red filter 32 positioned between the light source 20 and the baffles 24. In addition, a light diffusing glass 34 is interposed between the filter and the baffles.

A photovoltaic probe or photocell followed by suitable amplifying apparatus for indicating the amplitude of the light signal is employed as a probe. Since the probe is to indicate the net flow in some direction normal to a reference plane, its directional characteristics must be adjusted to read only the component of flow along that direction for photons moving in some arbitrary direction. This effect is produced if the sensitivity of the probe is made proportional to the cosine of the angle from the normal.

Figure 3:
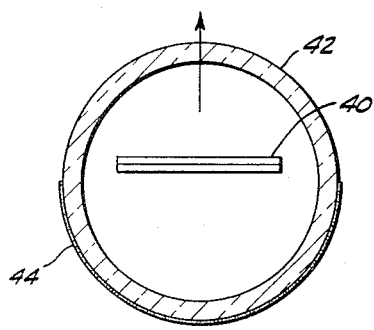
FIGURE 3 represents the appearance of a probe which may be employed with this invention.

Any photocell having a flat plate photo-surface can be given this cosine response by appropriate painting of the bulb of the photocell. FIGURE 3 is a cross-section of a photocell illustrating the manner of the painting. The flat sensitive surface 40 of the photocell is in the center of the bulb 42. One-half of the bulb is given a coating 44 of an opaque material, such as black paint. Thus, the photocell can only receive light from one direction.

A series of readings in some regular pattern is taken over the entire input and outlet areas of the model. For example, the area desired to be studied, can be divided into equal squares and a reading taken in the center of each square. Two readings will be taken at each location; one with the cell facing toward the light source, and the other facing 180° from the source. In the model shown, the positions of the probe at which readings are taken, occur on both sides of the baffle, since it is desired to determine the effects of the baffle on gas flow.

Any light reflection from the black surface representing the absorber or pump can normally be neglected.

If there were no absorption on the model surfaces, the input gas flow would be equal to the sum of the output flow and the backflow where each of these quantities is obtained by summing the individual readings of the probe over the entire area. The fraction of incident photons passing through the baffle would then be $P = \text{output}/\text{input}$. Now, since some loss is unavoidable, it is found that a more accurate result is obtained by using a fictitious input in the above expression. This fictitious input is $I_f = \text{output} + \text{backflow}$.

It will be noted that both the output and the backflow consists of photons which have encountered the model without being absorbed and hence behave as though the model had no absorption. This argument is only valid for small losses, but is quite accurate for the five percent loss resulting from the electroplated copper surface.

The overall probability of photons passing through a lossless model then becomes $P = \text{output}/\text{output} + \text{back}$ flow. For five percent absorbence this expression would usually be accurate to one percent. Thus, the effects of the backflow of vapor from the pump into the vacuum chamber can be detected by making measurements along the side of the baffle which is on the side of the light. The impedance of the flow of gas from the chamber to the pump can be measured by taking measurements on the side of the baffle which is adjacent the black surface. From these measurements and using the formulae given above, the effects of the baffle can be determined.

Figure 4:
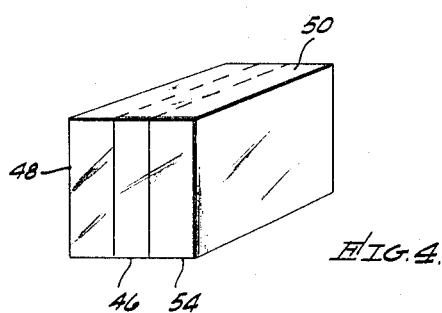
FIGURE 4 illustrates schematically how an analog model in accordance with this invention may be constructed to simulate repetitive structures using mirrors.

In many cases, some element of a vacuum system or cryogenic pump can be idealized in terms of a model which is either invariant or repetitive along axes perpendicular to the flow axes. In such a case, the model can be simplified by reducing it to a single cycle of the repetitive pattern and to a short segment in the invariant direction. The model can then in effect be extended and repeated to infinity by mirrors placed at the boundary of the actual model. Thus, as shown in FIGURE 4, the model 46 has mirrors placed on all four sides respectively 48, 50, 52, 54 to produce the effects of repetitive structures.

The use of mirrors for repetitive cycling can only be done when the model has bilateral symmetry, but the extension along an axis of invariance is not limited in this way.

There has accordingly been described and shown herein a novel, useful and simple molecular flow analog arrangement.

What is claimed is:

1. An analog for simulating the flow of gas molecules in a vacuum apparatus having a chamber, a vacuum pump for evacuating the chamber, and gas baffle means positioned between the pump and the chamber to prevent back flow of molecules from the pump into the chamber comprising:

an enclosure simulating the chamber, said enclosure including a first end and a second end substantially positioned opposite said first end;

a light source, said light source being positioned within said enclosure at the first end thereof, for emitting photons which simulate the flow of the gas molecules;

means for absorbing the photons emitted by said light source for simulating the vacuum pump, said means being positioned within said enclosure at the second end;

a light baffle comprising a plurality of chevron shaped copper plated baffles positioned parallel to each other within said enclosure, said light baffle being positioned in said enclosure between said light source and said absorbing means, for simulating the gas baffle;

an infrared filter positioned between said light source and said light baffles;

a light diffusing means positioned between said infrared filter and said light baffle; and a light detector, said light detector being positioned within said enclosure, for measuring the intensity of photons at several positions in said enclosure.

References Cited

UNITED STATES PATENTS

| | | | |
|---|---|---|---|
| 1,726,501 | 8/1929 | Norris | 35—19 |
| 3,097,254 | 7/1953 | Schwob | 35—19 X |
| 1,468,781 | 9/1923 | Gochenour | 35—45 |
| 2,525,638 | 10/1950 | Blout et al. | 250—86 X |

JEROME SCHNALL, *Primary Examiner.*

EUGENE R. CAPOZIO, *Examiner.*

H. S. SKOGQUIST, *Assistant Examiner.*